Dec. 17, 1935. H. K. BURGESS ET AL 2,024,846
CONVEYER
Filed April 21, 1934
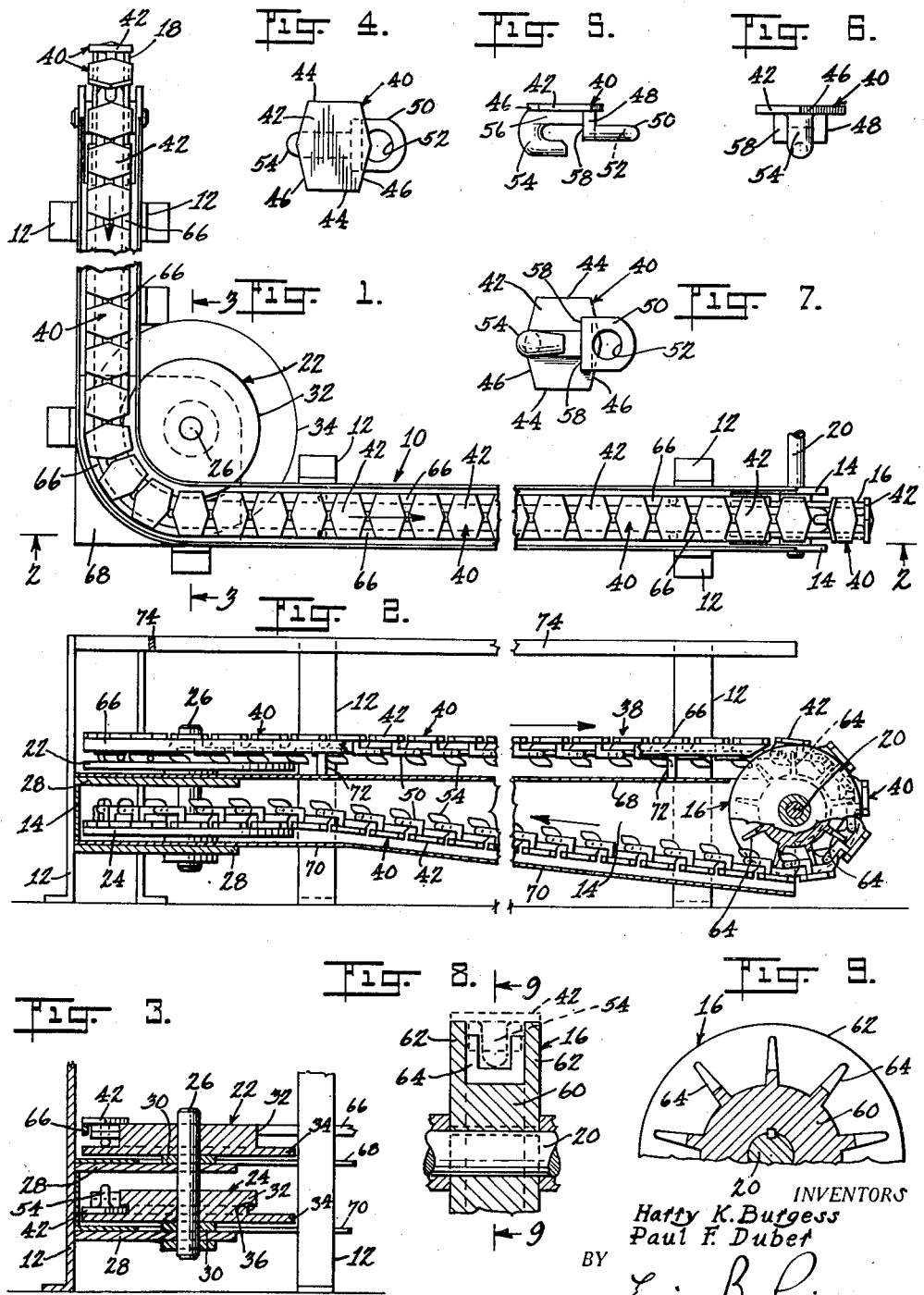
INVENTORS
Hatty K. Burgess
Paul F. Dubet
BY
Eric B. Prime
ATTORNEY Patented Dec. 17, 1935

2,024,846

UNITED STATES PATENT OFFICE 2,024,846

CONVEYER

Harry K. Burgess and Paul F. Duber,
Chicago, Ill.

Application April 21, 1934, Serial No. 721,710

7 Claims. (Cl. 198—189)

Our invention relates to improvements in conveyers.

An object of our invention is to provide a conveyer having a single chain adapted for carrying articles in a given horizontal direction and in different horizontal directions.

A further object of our invention is to provide a conveyer having a chain which may be mounted on sprockets or pulleys having horizontal axes for being moved in a vertical direction and which is adapted for being mounted on sprockets or pulleys having vertical axes whereby the chain may travel in different horizontal directions.

A further object of our invention is to provide a single conveyer chain which will carry articles in a straight line or around corners or both.

A further object of our invention is to provide a conveyer chain comprising links which are simple in construction and which may be quickly and easily assembled and disassembled without the use of tools.

In the accompanying drawing:

Figure 1 is a top plan view of a conveyer and chain embodying the invention;

Figure 2 is a vertical sectional view taken substantially along the lines 2—2 of Figure 1, certain portions being broken away;

Figure 3 is a vertical sectional view taken along the line 3—3 of Figure 1;

Figure 4 is a top plan view of a link which is representative of the links comprising the chain;

Figure 5 is a side elevation of the link shown in Figure 4;

Figure 6 is an end view of the link as viewed from the left in Figure 4;

Figure 7 is a bottom plan view of the link shown in Figure 4;

Figure 8 is a fragmentary transverse sectional view of the sprocket for driving the chain; and Figure 9 is a fragmentary longitudinal sectional view of the sprocket taken along the line 9—9 of Figure 8.

In the embodiment selected to illustrate our invention we provide a conveyer 10 comprising a plurality of standards 12 having spaced-apart side plates 14 connected therewith as shown in Figures 1 and 2.

A sprocket 16 and a pulley 18 are positioned between the side plates and at opposite ends of the conveyer structure, and are mounted on shafts which are carried by the side plates. The sprocket 16 is fixedly mounted on the shaft 20 which may be connected to any suitable power means, not shown, for rotating the sprocket.

The pulley 18 is rotatable on its shaft and is not connected to any power means. A more detailed description of the sprocket will follow.

A pair of intermediate pulleys 22 and 24 are mounted on a vertical shaft 26 which is supported by bracket members 28 connected with the standards 12. The pulleys 22 and 24 are retained in spaced relationship with the bracket members 28 by means of collars 30, which also retain the shaft 26 in position.

It will be noted that each of the pulleys 22 and 24 comprises a hub portion 32 and a flange portion 34, and that the hub portion 32 of the pulley 24 has a circumferential recess 36 adjacent its flange portion 34.

The function of the pulleys 22 and 24 will be hereinafter set forth.

As shown in Figures 1 and 2, a conveyer chain 38 is mounted on the pulleys 18, 22, and 24, and the sprocket 16. The chain comprises a series of connected links 40 which are identical in construction and, therefore; a description of one will suffice for all. Each link 40 comprises a plate or carrier portion 42 having substantially parallel side edges 44 and oppositely inclined end edges 46 which meet at an apex substantially at the axis of the plate portion.

An L-shaped flange portion is positioned transversely of the plate portion at an end thereof and comprises a downwardly extending flange portion 48 and a forwardly extending flange portion 50. The forwardly extending flange portion is provided with an opening 52 therein.

A hook portion 54 extends downwardly from the opposite end of the plate portion and is continuous with a shank portion 56 which extends to and joins the downwardly extending flange portion 48. The shank and hook portions 56 and 54, respectively, are narrower than the downwardly extending flange portion 48, in order that the flange portion 48 may provide projecting shoulders 58 for engagement with the sprocket wheel.

All of the parts of the link 40 are symmetrical about the longitudinal axis of the link and are preferably cast or otherwise formed in an integral unit from any suitable material such as bronze.

The links are connected for providing the chain by inserting the hook portion 54 of each link through the opening 52 of the next succeeding link, until an endless chain of sufficient length has been provided.

The sprocket 16 on which the chain is mounted for being driven comprises a hub portion 60 having a pair of spaced apart circumferential flange portions 62 for receiving the L-shaped flange portions and the hook portions of the links therebetween, but the flange portions of the sprocket are not spaced a sufficient distance apart to receive the plate portions of the links therebetween, the plate portions being adapted for engagement with the peripheries of the circumferential flange portions when the sprocket is rotated by the shaft 20.

As shown in Figures 2, 8 and 9, the sprocket 16 is provided with radially extending U-shaped projections or lugs 64 positioned between the circumferential flange portions and continuous therewith and with the hub portion 60.

The projections 64 of the sprocket engage the shoulders 58 of the links as shown in Figures 2 and 8 for driving the chain when the sprocket is rotated.

The pulley 18 is similar to the sprocket 16 except that the projections 64 are omitted, and the pulley 18 rotates freely.

In Figure 1 the plan view of the conveyer structure is shown as being L-shaped for the purpose of illustrating the manner in which the conveyer chain can go around a corner or an obstruction.

In making a turn the links first move onto the flange portions 34 of the pulleys 22 and 24 depending on whether the links are in the top or bottom sections of the chain. As the links continue their movements the L-shaped flange portions of the links move into engagement with the peripheries of the hub portions of the pulleys and remain in engagement therewith until the turn is completed.

On referring to Figure 3 it will be noted that when the links in the bottom section of the chain are making the turn the plate portions 42 of the links move into the circumferential recess in the hub 32 of the pulley 24 and remain in the recess until the turn is completed thereby holding the links against displacement.

As shown in Figures 1, 2 and 3, oppositely disposed link supporting bars 66 extend between the pulleys 18, 22 and the sprocket 16, and have the top surfaces thereof in substantially the same plane as the top surface of the pulley 16, the top edges of the flanges 62 of the sprocket, and the corresponding flanges of the pulley 18.

The L-shaped flanges and the hook portions of the links are receivable between the bars 66 and the plate portions of the links slide on the bars when the chain is in motion. Sufficient clearance is provided between the L-shaped flange portion and the bars to enable the links to complete the turn.

On referring to Figure 3 it will be noted that when the links in the top section of the chain are making the turn, the inner edges of the plate portions ride on the top surface of the hub 32 of the pulley 22, and the outer edges of plate portions continue to ride on the outer bar 66 which may be continuous between the pulley 18 and the sprocket 16.

Thus it will be seen that the plate portions of the links will remain in the same plane while carrying an article, whether they are traveling in a straight line or around corners.

By lifting the links positioned between the pulley 22 and the outer supporting bar 66 from therebetween, any link or section of links may be quickly and easily detached from the remainder of the chain or reconnected therewith, without the use of tools, after which the chain may be returned to its first position.

Top and bottom panels 68 and 70, respectively, are carried by the standards 12 and cooperate with the side plates 14 for enclosing the bottom section of the chain.

The bars 66 are shown as being mounted on pins 72 which in turn are carried by the top panel 68.

A guide rail 74 is also shown as being connected with the standards 12 for retaining articles carried by the conveyer chain against displacement.

Without further elaboration, it is believed that the foregoing fully explains the invention so that the same may be readily adapted for use under various conditions.

I claim:

1. A conveyer having a continuous chain comprising a series of links, each of said links comprising a carrier portion, a hook portion and an L-shaped flange portion connected with the carrier portion on a common side thereof and positioned at opposite ends of the carrier portion, the flange portions of each of said links having an opening therein for receiving the hook portion of an adjacent link for connecting the links whereby the carrier portions may be movable laterally and transversely with respect to each other, said chain being mounted on suitable means including a sprocket, said sprocket being provided with radially extending circumferential flange portions for receiving the hook portions and the L-shaped flange portions therebetween and adapted for engagement with the carrier portions, and projecting portions connected with the sprocket and adapted for engagement with the L-shaped flange portions for moving the chain when the sprocket is rotated.

2. In a conveyer chain, a plurality of connected one-piece links, each link having a carrier plate on top, a vertical flange beneath said plate and extending transversely thereof, a forward apertured extension at the lower edge of said flange lying in a horizontal plane, and a hook beneath said plate having a fastening shank integral with said carrier plate and extending from said flange to the rear edge of the plate, with its free shank curving downwardly and forwardly toward the flange to engage a corresponding apertured extension in the adjoining link in the chain.

3. In a conveyer chain, a plurality of connected one-piece links, each link having a carrier plate on top, a vertical flange beneath said plate and extending transversely thereof, a forward apertured extension at the lower edge of said flange lying in a horizontal plane, and a hook beneath said plate curving downwardly and forwardly toward the flange and having a bearing surface to engage a bearing surface in a corresponding apertured extension in the adjoining link in the chain, at least one of the said bearing surfaces being arcuate in shape in a horizontal plane to permit said hook to pivot about a vertical axis in said extension.

4. In a conveyer chain, a plurality of connected one-piece links, each link having a carrier plate on top, a vertical flange beneath said plate and extending transversely thereof, a forward apertured extension at the lower edge of said flange lying in a horizontal plane, and a hook beneath said plate curving downwardly and forwardly toward the flange to engage in a corresponding apertured extension in the adjoining link in the chain, said links including said extensions and hooks being so shaped that each extension is pivotable about a horizontal axis within the associated hook, and each hook is pivotal about a vertical axis within the associated extension.

5. In a conveyer chain, a plurality of connected one-piece links, each link having a carrier plate on top, an extension extending downwardly and forwardly from the forward half of said plate and having an aperture therethrough with a vertical axis, and a hook beneath the rear portion of said plate curving downwardly and forwardly toward the extension and having a horizontally disposed arcuate bearing surface to engage and pivot about a vertical axis in a corresponding apertured extension in the adjoining link in the chain, said extension and hook being so shaped that the extension is pivotable about a horizontal axis within the hook.

6. In a conveyer chain, a plurality of connected one-piece links, each link having a carrier plate on top, an extension extending downwardly and forwardly from the forward half of said plate and having an aperture therethrough with a vertical axis, and a hook beneath the rear portion of said plate curving downwardly and forwardly toward the extension and having a horizontally disposed arcuate bearing surface to engage and pivot about a vertical axis in a corresponding apertured extension in the adjoining link in the chain, said links each including a rearwardly facing shoulder portion on its underside for engagement with a driving spocket.

7. In a conveyer chain, a plurality of connected one-piece links, each link having a carrier plate on top, an extension extending downwardly and forwardly from the forward half of said plate and having an aperture therethrough with a vertical axis, and a hook beneath the rear portion of said plate curving downwardly and forwardly toward the extension and having a horizontally disposed arcuate bearing surface to engage and pivot about a vertical axis in a corresponding apertured extension in the adjoining link in the chain, said extensions forming laterally facing shoulders for engaging a horizontally disposed pulley about which the conveyer chain may turn.

HARRY K. BURGESS.
PAUL F. DUBER.